(12) United States Patent
Ide et al.

(10) Patent No.: US 7,218,685 B2
(45) Date of Patent: May 15, 2007

(54) DIRECT CONVERSION RECEIVER

(75) Inventors: Teruji Ide, Tokyo (JP); Kazuo Akaike, Hamura (JP); Kazushi Takahashi, Tokyo (JP); Manabu Nakamura, Tokyo (JP)

(73) Assignee: Hitachi Kokusai Electric Inc., Tokyo (JP)

(*) Notice: Subject to any disclaimer, the term of this patent is extended or adjusted under 35 U.S.C. 154(b) by 855 days.

(21) Appl. No.: 10/386,603

(22) Filed: Mar. 13, 2003

(65) Prior Publication Data

US 2003/0179837 A1 Sep. 25, 2003

(30) Foreign Application Priority Data

Mar. 25, 2002 (JP) .......................... P.2002-083191

(51) Int. Cl.
  *H04L 27/22* (2006.01)
  *H04B 1/30* (2006.01)
(52) U.S. Cl. ...................................... 375/316; 455/324
(58) Field of Classification Search ................ 375/377, 375/224, 327, 316, 326, 345, 322, 324; 455/324, 455/200, 226.1, 302, 226.2, 226.3, 285, 230, 455/232.1, 231, 234.1, 234.2
See application file for complete search history.

(56) References Cited

U.S. PATENT DOCUMENTS 4,464,770 A * 8/1984 Maurer et al. .............. 375/373
5,826,180 A * 10/1998 Golan ......................... 455/302
5,999,802 A * 12/1999 Aschwanden ............. 455/196.1
6,427,068 B1 * 7/2002 Suominen .................. 455/302
6,563,887 B1 * 5/2003 Casagrande ................. 375/334
6,608,999 B1 * 8/2003 Jakobsson .................. 455/303
2002/0150173 A1 * 10/2002 Buda ......................... 375/316
2003/0125000 A1 * 7/2003 Gharpurey et al. ...... 455/234.1

FOREIGN PATENT DOCUMENTS

JP          10-070482          3/1998

* cited by examiner

*Primary Examiner*—Tesfaldet Bocure
*Assistant Examiner*—Vineeta S. Panwalkar
(74) *Attorney, Agent, or Firm*—Jacobson Holman PLLC

(57) ABSTRACT

To solve such a problem of a conventional direct conversion receiver that an image rejection ratio is insufficient owing to analog processing employed to reject an image, the present invention provides such a direct conversion receiver that the image can be rejected by digital signal processing to improve the image rejection ratio and also reduce the hardware load and the processing load. A HILBERT filter of a digital signal processing section shifts a quadrature component digital signal by 90° by HILBERT conversion to provide an output, while a delay circuit delays an in-phase component digital signal by the same delay time as a delay time by the HILBERT filter to provide an output, both of which outputs undergo addition or subtraction at an adder to have the image rejected there and then enter a complex frequency converter, where an offset provided at a local oscillator is removed by frequency conversion processing to output the in-phase component and quadrature component signals.

6 Claims, 3 Drawing Sheets

DIRECT CONVERSION RECEIVER

BACKGROUND OF THE INVENTION

1. Field of the Invention

The present invention relates to a type of direct conversion used in a receiver etc. and more particularly to, a direct conversion receiver which can improve an image signal rejection ratio and, further, reduce the load of hardware and processing.

2. Description of the Related Art

In a configuration of a receiver employing a type of direct conversion, which is one of the conversion methods used in a receiver etc., when a modulated radio wave is received, almost the same frequency of a carrier wave signal (local frequency) as that of a desired reception frequency of this received signal is output by a local oscillator, so that the output signal from this local oscillator and the received signal are mixed to thereby convert a reception wave in the RF band directly into a base-band signal, which is then detected and demodulated.

By such a direct conversion receiver, however, since the frequency of a carrier wave output from the local oscillator is the same as that of a desired reception signal, such a DC (Direct Current) offset phenomenon occurs that the output from the local oscillator is input again to another input of the multiplication processing to be multiplied again by the output of the local oscillator to thereby offset a DC component of the base band signal or such a fundamental problem occurs that 1/f noise is generated because the intermediate frequency of the base band signal obtained by the multiplication is nearly 0 (zero), thus making it difficult to receive signals in a wide range of band.

To guard against this, there is available a direct conversion receiver employing the low IF (Intermediate Frequency) system.

By the direct conversion method of the low IF system, an offset frequency (difference in frequency) having such a extent as not to generate a DC offset or 1/f noise is given between a desired reception frequency and a frequency output by the local oscillator, to then convert the reception signal to a low IF, so that the reception signal is converted in frequency by the digital signal processing using the offset frequency, thus obtaining in-phase and quadrature outputs.

In the low IF system, however, it is necessary to suppress an image signal at an image frequency so that it may not overlap with the desired signal.

The above-mentioned conventional direct detection circuit has a problem that it is difficult to sufficiently attenuate at the band pass filter such an image frequency signal contained in a reception signal, with respect to a desired wave, so that it may sometimes be necessary to make variable the intermediate frequency, the band, etc. of the band pass filter.

That is, it is difficult to obtain wide band characteristics of a receiver provided with a direct conversion and so to implement a wide band low IF receiver.

To solve the above-mentioned problem of the image frequency signal, there is available such a method as to give processing way for rejecting the image signal.

By this method, for example, in a low IF-type direct conversion receiver, a desired reception signal is multiplied by a local-oscillator's frequency provided with an offset frequency to be down-converted into a low-IF signal, which then undergoes image signal rejection and then digital signal processing to convert the offset frequency, thus obtaining an in-phase output and a quadrature output.

Note here that one conventional technology related to a direct detection-system receiver is disclosed in Japan Patent Application Laid-Open No. Hei 10-70482 published on Mar. 10, 1998 (Applicant: Philips Electronics, Nemrose, Fennohtsharp, Inventor: Paul, Anthony, Moore, et al.)

This conventional technology provides an integrated receiver using a local oscillator which oscillates an intermediate frequency of a desired signal wave higher than a frequency of an interference signal wave directly detected to thereby down-convert the frequency of an input signal, thus removing the influence by the interference signal.

In a type of conventional low-IF direct conversion receiver, however, the image rejection processing section performs analog processing, so that there occurs an error in the coefficient of an analog filter etc. caused by fluctuations etc. in characteristics of the analog elements, thus giving rise to a problem of an insufficient image rejection ratio.

If, for example, an average value of the fluctuations in characteristics of the elements is 1%, the limit of the image suppression ratio by analog processing is 40 dB or so, thus giving rise to a problem of poor performance of image rejection.

SUMMARY OF THE INVENTION

In view of the above, it is an object of the present invention to provide a direct conversion receiver which can reject an image by digital signal processing to improve an image rejection ratio and, furthermore, reduce the load of hardware and processing complexity.

The present invention provides a direct conversion receiver which comprises a local oscillator which oscillates a carrier wave having a reception frequency plus an offset; a first multiplier which multiplies a reception signal by an output of the local oscillator; a first low pass filter which rejects a double wave from an output of the first multiplier; a first AD converter which converts an output of the first low pass filter into a digital signal to provide an in-phase component of the digital signal; a 90° phase shifter which shifts the output of the local oscillator by 90°; a second multiplier which multiplies the reception signal by an output of the 90° phase shifter; a second low pass filter which reject the double wave from an output of the second multiplier; a second AD converter which converts an output of the second low pass filter into the digital signal to provide a quadrature component of the digital signal; and a digital signal processing section which performs processing for receiving the in-phase component of the digital signal and the quadrature component of the digital signal to reject an image frequency signal contained in these received signals and which performs frequency conversion processing for removing the offset provided at the local oscillator, whereby an image rejection ratio given by digital signal processing, which is employed to reject the image frequency signal, can be improved as compared to a case where analog processing is employed.

In the above-mentioned direct conversion receiver of the present invention, the digital signal processing section comprises a HILBERT filter which receives the quadrature component of the digital signal output from the second AD converter and which performs 90° phase shift processing by HILBERT conversion; a delay circuit which receives the in-phase component of the digital signal output from the first AD converter to output it with the same delay time as a delay time by the HILBERT filter; an adder which performs addition or subtraction between an output of the HILBERT filter and an output of the delay circuit; a complex frequency converter which performs frequency conversion processing for removing an offset provided at the local oscillator from an output of the adder in order to output the in-phase component and quadrature component signals; and a low pass filter which gives a band limit to each of the in-phase component and quadrature-component signals sent from the complex frequency converter, whereby the image rejection ratio give by digital signal processing, which is employed to reject the image frequency signal, can be improved as compared to the case where analog processing is employed.

In the above-mentioned low-IF type direct conversion receiver of the present invention, the HILBERT filter comprises an odd number of the delay circuits for outputting an input signal while the input signal is delayed, the delay circuits being connected in series and divided into a front-stage group and a rear-stage group symmetrically with respect to the central one of the odd number of the delay circuits; a plurality of adders which performs addition or subtraction between the input signals of the delay circuits of the front-stage group and the output signals of the delay circuits of the rear-stage group disposed symmetrically with each other; an adder which performs addition or subtraction between the input and output signals of the central delay circuit; a plurality of multipliers which multiplies the output signal of each of the adders by a filter coefficient; and an adder which adds up the outputs of the plurality of multipliers, whereby the signals are multiplied by the filter coefficient after undergoing addition or subtraction and then are added up, to halve the number of the required multipliers, thus greatly reducing the configuration load of the hardware.

In the above-mentioned low-IF type direct conversion receiver of the present invention, the plurality of multipliers of the HILBERT filter does not perform the multiplication when the filter coefficient for the multiplication is 0, to halve the number of required multiplication operations performed by the multipliers, thus greatly reducing the processing load.

Furthermore, in the above-mentioned direct conversion receiver of the present invention, the complex frequency converter comprises a first SIN table and a first COS table which are set beforehand to perform frequency conversion processing for rejecting the offset provided at the local oscillator; a first multiplier which multiplies an input signal by a value in the first SIN table to output an in-phase component signal; and a second multiplier which multiplies the input signal by a value in the first COS table to output a quadrature component signal, whereby the offset frequency can be rejected by a simple configuration and processing.

In the above-mentioned direct conversion receiver of the present invention, the complex frequency converter comprises a second SIN table and a second COS table which are set beforehand to perform frequency conversion processing for rejecting a minute frequency offset; a third multiplier which multiplies the in-phase component signal from the first multiplier by a value in the second SIN table; a fourth multiplier which multiplies the in-phase component signal from the first multiplier by a value of the second COS table; a fifth multiplier which multiplies the quadrature component signal from the second multiplier by the value in the second COS table; a sixth multiplier which multiplies the quadrature component signal from the second multiplier by the value of the second SIN table; a subtractor which subtracts the outputs of the third and fifth multipliers; and an adder which adds up the outputs of the fourth and sixth multipliers, whereby even the minute frequency offset can be reject accurately.

EXPLANATION OF REFERENCE NUMERALS

Figure 1:
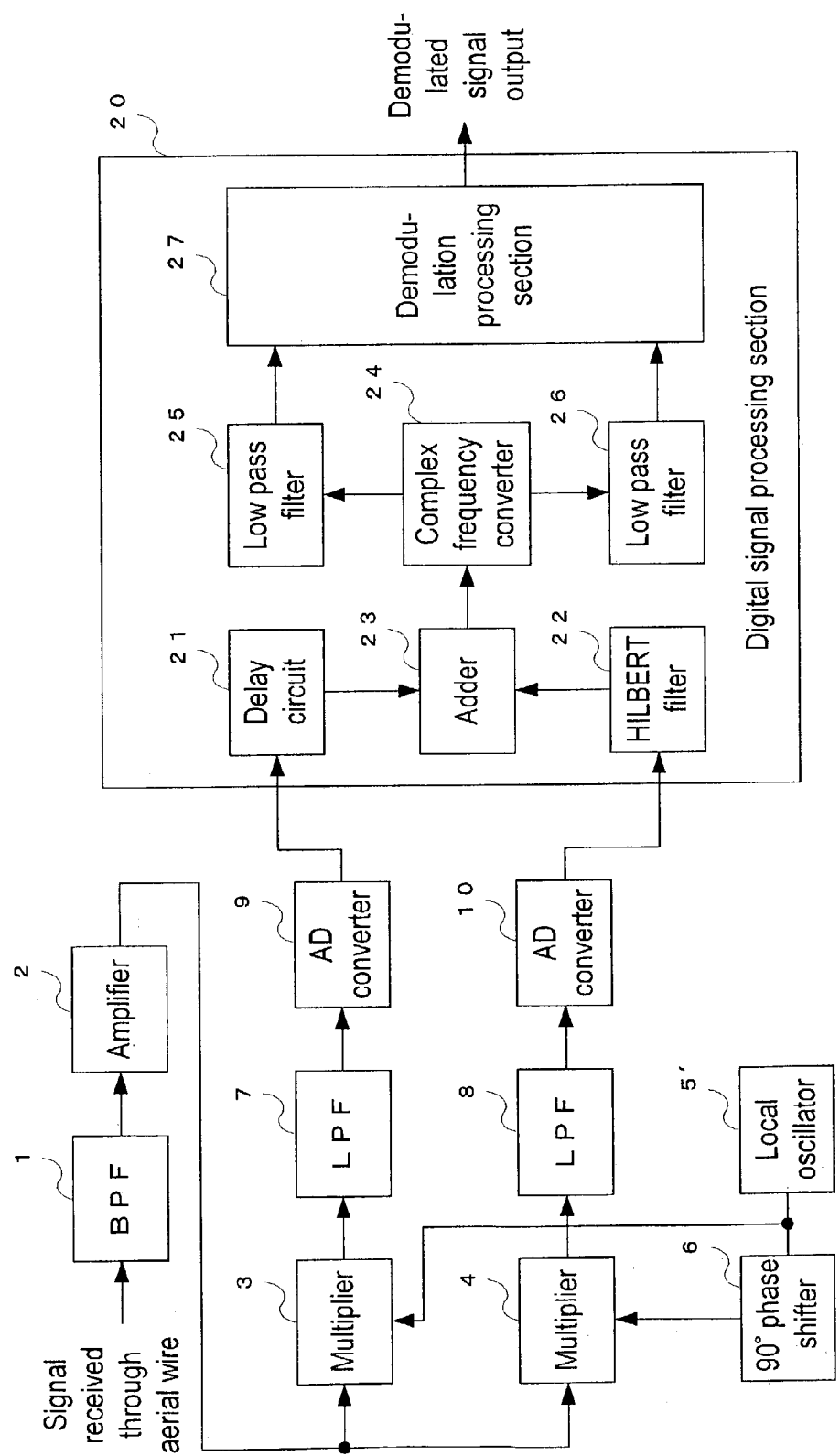
FIG. 1 is a block diagram for showing a configuration of a direct conversion receiver related to the present invention.

1 Band pass filter (BPF)
2 Amplifier
3, 4 Multiplier
5, 5' Local oscillator
6 90° phase shifter
7, 8 Low pass filter (LPF)
9, 10 AD converter
20 Digital signal processing section
21 Delay circuit
22 HILBERT filter
23 Adder
24 Complex frequency converter
25, 26 Low pass filter
27 Demodulation processing section
30 delay circuit
31, 33 Adder
32 Multiplier
40, 44 SIN table
41, 43, 46, 47, 48, 49 Multiplier
42, 45 COS table
50 Subtractor
51 Adder

DESCRIPTION OF THE PREFERRED EMBODIMENTS

The following will describe embodiments of the present invention with reference to drawings.

Note here that any means that can implement a function described hereinafter may be any circuit or device, which function can be implemented by software wholly or partially. Furthermore, the function implementing means may be made up of a plurality of circuits or a plurality of function implementing means may be made up of a single circuit.

In a broader term, a low-IF type direct conversion related to the present invention receives a digital signal of an in-phase component and that of a quadrature component which are detected in a quadrature manner using a local oscillator which oscillates a carrier wave at a frequency of a reception frequency plus an offset, to perform processing to reject an image frequency signal contained in the reception signals at a digital signal processing section and also frequency conversion processing to remove the offset provided at the local oscillator at the time of quadrature detection, so that the digital signal processing is utilized to reject the image frequency signal, thus improving an image rejection ratio as compared to a case by analog processing.

This is described in terms of function implementing means as follows: in the direct conversion receiver related to the present invention, a digital signal processing section includes: a HILBERT filter which receives an incoming digital signal of a quadrature component output from a second AD converter to shift it in phase by 90° using HILBERT conversion; a delay circuit which receives a digital signal of an in-phase component output from a first AD converter to output it with the same delay time as a delay time by the HILBERT filter; an adder which performs addition or subtraction between an output of the HILBERT filter and an output of the delay circuit; a complex frequency converter which performs frequency conversion processing to remove the offset provided at the local oscillator from an output of the adder in order to output the in-phase component and quadrature component signals; and a low pass filter which gives a band limit to each of the in-phase component and quadrature component signals sent from the complex frequency converter, whereby the signal obtained by shifting in phase the quadrature component by 90° using the HILBERT filter and the signal obtained by delaying the in-phase component using the delay circuit are subject to addition or subtraction at the adder to reject the image frequency signal, so that the image rejection ratio given by digital signal processing, which is employed to reject the image frequency signal, can be improved as compared to the case where analog processing is employed.

First a configuration of a direct conversion receiver related to the present invention is described with reference to FIG. 1. FIG. 1 is a block diagram for showing a configuration of the direct conversion receiver related to the present invention.

As shown in FIG. 1, the low IF-system direct conversion receiver (present circuit) comprises, as components similar to the conventional ones, a band pass filter 1 (BPF in the figure), an amplifier 2, multipliers 3 and 4, a local oscillator 5', a 90° phase shifter 6, a low pass filter 7 (LPF in the figure), a low pass filter 8, and AD converters 9 and 10 and also, additionally as a characteristic component of the present invention and in place of conventional components of an image rejection processing section, a frequency conversion processing section, and a base band demodulation section, a digital signal processing section 20 which performs digital signal processing to perform processing for rejecting an image frequency signal (image signal) contained in a reception signal, frequency conversion processing for removing said offset provided at said local oscillator, and demodulation processing.

Furthermore, the digital signal processing section 20 incorporates: a delay circuit 21, a HILBERT filter 22, and an adder 23 as components for image frequency signal rejection processing, a complex frequency converter 24 and low pass filters 25 and 26 as components for offset rejection processing, and a demodulation processing section 27 as a component for demodulation processing.

Next, these components of the present circuit are each described specifically as follows.

The band pass filter 1 is of a typical type for filtering a reception signal input through an aerial wire into required band and attenuation level to thereby extract a signal in a desired frequency band and output it.

The amplifier 2 is of a typical type having a predetermined required amplification factor.

Similar to the local oscillator 5' in the conventional second direct conversion receiver, the local oscillator 5' is of a typical type for outputting a carrier wave at a frequency of a desired reception frequency plus an offset (difference in frequency) having such an extent as not to generate an DC offset or 1/f noise The 90° phase shifter 6 is provided to shift a signal output from the local oscillator 5 by 90°.

The multiplier 3 is provided to multiply a reception signal and a carrier wave at a frequency of a desired reception frequency plus an offset from the local oscillator 5 to then output an in-phase component thereof.

The multiplier 4 is provided to multiply a reception signal and a carrier wave obtained by shifting the carrier wave at the same frequency as a reception frequency sent from the local oscillator by 90° in phase by the 90° phase shifter 6 to then output a quadrature component thereof.

The low pass filter (LPF) 7 is of a typical type for rejecting a double wave of the in-phase component output from the multiplier 3.

The low pass filter (LPF) 8 is of a typical type for rejecting a double wave of the quadrature component output from the multiplier 4.

The AD converter 9 is provided to convert an analog signal into a digital one to then output a digital signal of the in-phase component.

The AD converter 10 is provided to convert an analog signal into a digital one to then output a digital signal of the quadrature component.

The base band demodulation section 27 demodulates the incoming digital signals of the in-phase component and quadrature component by digital signal processing to output a demodulated signal.

The following will describe each of the components provided in the digital signal processing section 20.

The HILBERT filter 22 consists of a Finite Impulse Response (FIR) filter which performs phase shift processing to shift a phase of an input signal by 90° by performing HILBERT conversion processing. Its specific configuration example is described later.

Furthermore, any other configuration other than a HILBERT filter may be employed as far as it performs phase shift processing to shift the phase of the input digital signal by 90°.

The delay circuit 21 is provided to delay the input signal by a delay time that corresponds to a processing delay time through the HILBERT filter 22.

The adder 23 is provided to perform addition or subtraction between a quadrature component signal shifted in phase by 90° through the HILBERT filter 22 and an in-phase component signal delayed through the delay circuit 21.

The complex frequency converter 24 is provided in place of the conventional frequency conversion processing section, to perform digital signal processing to remove the offset provided at the local oscillator 5' using frequency conversion to output an in-phase component signal and a quadrature component signal.

The low pass filters 25 and 26 are provided to desired frequency band limitation on each of the in-phase component and quadrature component signals output from the complex frequency converter 24 to thereby extract a desired wave signal.

The demodulation processing section 27 is provided to perform demodulation processing much the same way as the conventional base band demodulation section.

The following will describe the operations of the low-IF type direct conversion receiver of the present invention with reference to FIG. 1 and also based on the operating principles.

In the low-IF type direct conversion receiver of the present invention, a reception signal from an antenna is filtered by the band pass filter 1 (BPF) into required band and attenuation level, where its signal other than an image signal rejected and then inputs the amplifier 2 to be amplified linearly at a receiver using a predetermined required amplification factor.

Then, the reception signal thus amplified at the amplifier 2 is multiplied at the multiplier 3 by a carrier wave at a frequency of a reception frequency plus an offset frequency from the local oscillator 5', the output signal from the multiplier 3 is an in-phase component and, at the same time, multiplied at the multiplier 4 by a carrier wave obtained by shifting at the 90° phase shifter the carrier wave at a frequency of a reception frequency plus an offset frequency sent from the local oscillator 5', the output signal from the multiplier 4 is quadrature component thereof.

The in-phase component and the quadrature component pass through the low pass filters 7 and 8 respectively to have their double waves rejected and then enter the AD converters 9 and 10 respectively, where they are converted from an analog form into a digital form of signal.

Assuming now that the amplitude of an output signal of the local oscillator 5' is $V_C$, its angular frequency is $\omega_C+\omega_{\Delta f}$, the amplitude of a signal component of a desired signal is $V_S$, its angular frequency is $\omega_{SS}$, the amplitude of an image signal component is $V_i$, and its angular frequency is $\omega_{Si}$, the reception signal Vrf input to the multipliers 3 and 4 is given by the following equation:

$$V_{rf} = V_i \cos(\omega_C - \omega_{Si})t + V_S \cos(\omega_C + \omega_{SS})t$$

Assuming also that the conversion coefficient of a mixer at the multiplier 3 is K, an output $V_{MIX01}$ of the multiplier 3 is given by the following equation:

$$V_{MIX01} = K \cdot \{V_i \cos(\omega_C - \omega_{Si})t + V_S \cos(\omega_C + \omega_{SS})t\} \cdot V_C \cos(\omega_C + \omega_{\Delta f})t$$

Then, the output $V_{LPF01}$ of the low pass filter 7 obtained after the double wave is rejected from the output of the multiplier 3 is given by the following equation:

$$V_{LPF01} = \{(K \cdot V_i \cdot V_C)/2\} \cos(\omega_{Si} + \omega_{\Delta f})t + \{(K \cdot V_S \cdot V_C)/2\} \cdot \cos(\omega_{\Delta f} - \omega_{SS})t$$

Assuming that the conversion coefficient of a mixer in the multiplier 4 is K as in the case of the multiplier, on the other hand, the output $V_{MIX02}$ of the multiplier 4 is given by the following equation:

$$V_{MIX02} = K \cdot \{V_i \cos(\omega_C - \omega_{Si})t + V_S \cos(\omega_C + \omega_{SS})t\} \cdot V_C \cdot \{-\sin(\omega_C + \omega_{\Delta f})t\}$$

Then, the output $V_{LPF02}$ of the low pass filter 8 after the double wave is rejected from the output of the multiplier 4 is given by the following equation:

$$V_{LPF02} = \{-(K \cdot V_i \cdot V_C)/2\} \cdot \sin(\omega_{Si} + \omega_{\Delta f})t + \{(K \cdot V_S \cdot V_c)/2\} \cdot \sin(\omega_{SS} - \omega_{\Delta f})t$$

Then, inside the digital signal processing section 20, the digital signal output from the AD converter 9 is delayed at the delay circuit 21, while the digital signal output from the AD converter 10 is HILBERT-converted at the HILBERT filter 22, so that the resultant outputs are added to each other by the adder 23 to reject the image signal.

The output VLPF02 of the low pass filter 8 is converted at the AD converter 10 from an analog form into a digital form of signal and then HILBERT-converted at the HILBERT filter 22 to provide a signal $V_{HIL0}$ such as given by the following equation:

$$V_{HIL01} = \{-(K \cdot V_i \cdot V_C/2) \cos(\omega_{Si} + \omega_{\Delta f})t + \{(K \cdot V_S \cdot V_C)/2\} \cdot \cos(\omega_{\Delta f} - \omega_{SS})t$$

Then, the output VADD of the adder 23 is given by the following equation:

$$\begin{aligned}V_{ADD} &= V_{LPF01} + V_{HIL0}\\ &= \{(K \cdot V_i \cdot V_C)/2\} \cdot \cos(\omega_{Si} + \omega_{\Delta f})t +\\ &\quad \{(K \cdot V_S \cdot V_C)/2\} \cdot \cos(\omega_{\Delta f} - \omega_{SS})t +\\ &\quad \{-(K \cdot V_i \cdot V_C)/2\} \cdot \cos(\omega_{Si} - \omega_{\Delta f})t +\\ &\quad \{(K \cdot V_S \cdot V_C)/2\} \cdot \cos(\omega_{\Delta f} - \omega_{SS})t\\ &= (K \cdot V_S \cdot V_C) \cdot \cos(\omega_{SS} - \omega_{\Delta f})t\end{aligned}$$

Note here that if the relationship between the image signal ($\omega_{Si}$) and a desired reception wave signal ($\omega_{SS}$) is reversed, the adder 23 can be replaced by a subtractor to thereby reject the image signal similarly as follows:

$$\begin{aligned}V_{ADD(SUB)} &= V_{LPF01} - V_{HIL0}\\ &= \{(K \cdot V_i \cdot V_C)/2\} \cdot \cos(\omega_{Si} + \omega_{\Delta f})t +\\ &\quad \{(K \cdot V_S \cdot V_C)/2\} \cdot \cos(\omega_{\Delta f} - \omega_{SS})t -\\ &\quad \{-(K \cdot V_i \cdot V_C)/2\} \cdot \cos(\omega_{Si} + \omega_{\Delta f})t -\\ &\quad \{(K \cdot V_S \cdot V_C)/2\} \cdot \cos(\omega_{\Delta f} - \omega_{SS})t\\ &= (K \cdot V_i \cdot V_C) \cdot \cos(\omega_{Si} + \omega_{\Delta f})t\end{aligned}$$

In this equation where the image signal ($\omega_{Si}$) is extracted, if it is assumed that the relationship between the image signal ($\omega_{Si}$) and the desired reception wave signal ($\omega_{SS}$) is reversed with the initially defined variable symbols unchanged, the desired reception wave signal can be extracted.

Then, the output signal of the adder 23 with the image signal as rejected is converted at the complex frequency converter 24 by as much as the offset frequency $\Delta f$ to obtain an in-phase output and a quadrature output which are required in demodulation processing, which then undergo filtering at the low pass filters 25 and 26 respectively and then undergo demodulation processing at the demodulation processing section 27.

The output VADD of the adder 23 is converted at the complex frequency converter 24 by as much as the offset frequency $\Delta f$ and undergoes filtering at the low pass filters 25 and 26, thus providing a resultant output $V_{LPF}$ given by the following equation in a complex format:

$$\begin{aligned}V_{LPF} &= (K \cdot V_S \cdot V_C) \cdot e^{j(\omega SS - \omega \Delta f)t} \cdot e^{j(\omega \Delta f)t}\\ &= (k \cdot V_S \cdot V_C) \cdot e^{j(\omega SS)t}\end{aligned}$$

Then, an intended desired wave signal can be demodulated.

Figure 2:
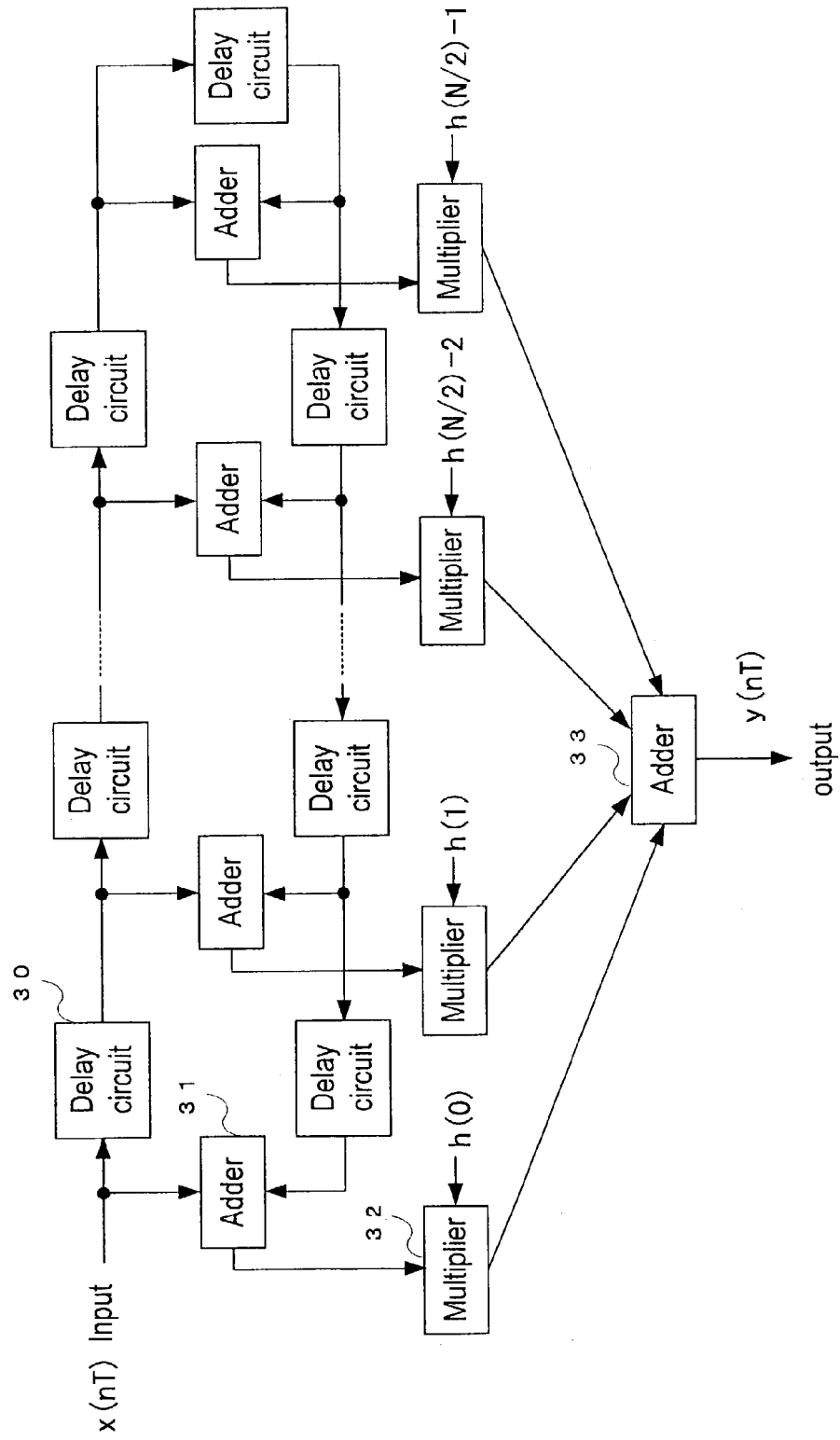
FIG. 2 is a block diagram for showing a specific configuration example of a HILBERT filter in the direct conversion receiver of the present invention.

The following will describe a specific configuration example of the HILBERT filter 22 of the present invention with reference to FIG. 2. FIG. 2 is a block diagram for showing the specific configuration example of the HILBERT filter 22 in the direct conversion receiver of the present invention.

The HILBERT conversion processing consists of 90° phase shift processing having frequency characteristic such as given by the following equation:

$$H(j\omega) = e^{-j\pi/2} = -j \ (0 \leq \omega \leq \pi)$$
$$+j \ (\pi \leq \omega \leq 2\pi)$$

Then, H(jω) can be subjected to inverse Fourier conversion to obtain a filter coefficient $h_k$ such as given by the following equation. In this case, $-\infty < k < \infty$.

| | |
|---|---|
| $h_k = 0$ | (k: Even number) |
| $2/(k\pi)$ | (k: Odd number) |

In the HILBERT filter 22 which actually implements HILBERT conversion processing, the filter tap length is limited to a finite length to provide a configuration and operation for multiply the transfer function by the window function.

That is, as shown in FIG. 2, the specific configuration example of the HILBERT filter 22 of the present invention comprises an odd number of delay circuits 30 which are connected in series and divided into a front-stage group and a rear stage group symmetrically with respect to the central delay circuit 30, a plurality of adders 31 which performs subtraction between an input signal of the delay circuit of the front stage group and an output signal of the symmetrical delay circuit of the rear stage group, an adder 31 which performs subtraction between an input signal and an output signal of the central delay circuit, a multiplier which multiplies the results of the subtraction by a HILBERT coefficient, and an adder 33 which adds up the multiplication results.

in this configuration, the HILBERT filter 22 is odd-number symmetrical with respect to an origin (central delay circuit 30) as a center, whereby respective inputs and outputs of the mutually symmetrical delay circuits 30 can undergo subtraction, multiplication by the filter coefficient, and then addition to thereby reduce the number of the multipliers 32 to half that of the delay circuits 30, thus greatly reducing the configuration load of the hardware.

Furthermore, as described in the above-mentioned equation, when k is an even number, the filter coefficient $h_k$ is 0, so that by performing no multiplication in such a case, it is possible to further reduce the number of the multiplication operations in the multipliers 32 to half that of the all of the filter coefficients, thus greatly reducing the processing load.

Figure 3:
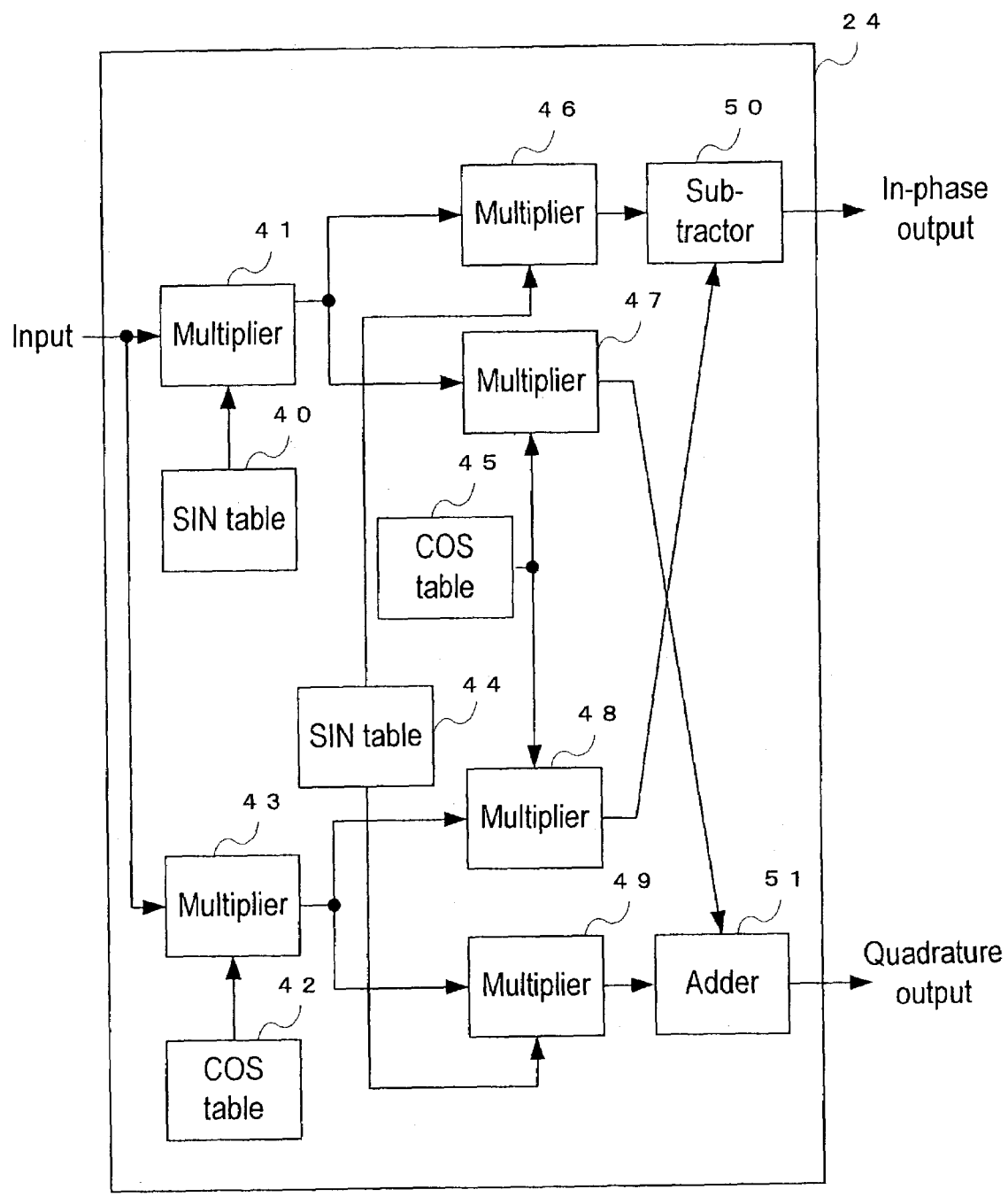
FIG. 3 is a block diagram for showing a specific configuration example of a complex frequency converter in the direct conversion receiver of the present invention.

The following will describe a specific configuration example of the complex frequency converter 24 of the present invention with reference to FIG. 3. FIG. 3 is a block diagram for showing the specific configuration example of a complex frequency converter 24 in the low-IF type direct conversion receiver of the present invention.

As shown in FIG. 3, in the specific configuration example, the complex frequency converter 24 in the low-IF type direct conversion receiver of the present invention comprises a SIN table 40 and a COS table 42 which are set beforehand to remove an offset provided at the local oscillator 5, a multiplier 41 which multiplies an input signal by a value of the SIN table 40 to output an in-phase component, and a multiplier 43 which multiplies the input signal by a value of the COS table 42 to output a quadrature component.

Moreover, it is provided with a SIN table 44 and a COS table 45 which are set beforehand to remove a minute frequency offset, a multiplier 46 which multiplies the in-phase component output from the multiplier 41 and a value of the SIN table 44, a multiplier 47 which multiplies it by a value of the COS table 45, a multiplier 49 which multiplies the quadrature component output from the multiplier 42 by a value of the SIN table 44, a multiplier 48 which multiplies it by a value of the COS table 45, a subtractor which performs subtractions on an output of the multiplier 46 and that of the multiplier 48, and an adder 51 which adds up an output of the multiplier 47 and that of the multiplier 49.

By the operations of the complex frequency converter 24 in the low-IF type conversion receiver of the present invention, a signal which has an offset and from which an image is rejected already is, when output from the adder 23, input to the multipliers 41 and 43 to be multiplied by the respective values of the SIN table 40 and the COS table 42 there so that the offset may be rejected, thus outputting in-phase and quadrature components.

Outputs of the multipliers 41 and 43 are input to the multipliers 46 and 47 and the multipliers 48 and 49 respectively to be multiplied by the respective values of the SIN table 44 and the COS table 45 and then input the subtractor 50 and the adder 51, where the minute frequency offset is converted in frequency.

Note here generally that the processing load of multiplication of a carrier wave increases with the increasing carrier frequency, so that preferably the carrier wave multiplication processing is performed by an FPGA (Field Programmable Gate Array) and the other processing, by a DSP (Digital Signal Processor) etc. in configuration.

Furthermore, if the low-IF type direct conversion receiver of the present invention is implemented using a DSP etc., its multipliers, adders, subtractors may be implemented by software.

In the low-IF type direct conversion receiver of the present invention, a signal having an image frequency generated in multiplication of a frequency output by the local oscillator on the transmission side undergoes image rejection in digital signal processing at the digital signal processing section 20, thus giving an effect of improving the image rejection ratio up to approximately 60 dB in digital signal processing as compared to an insufficient limit value of 40 dB or so of the insufficient rejection ratio by the conventional analog processing.

Furthermore, digital signal processing is utilized in image rejection to reduce the hardware load as well as the processing load.

Specifically, in this image rejection configuration, an in-phase component signal and a quadrature component signal obtained by multiplying the outputs of the local oscillator 5' enter the delay circuit 21 and the HILBERT filter 22 where the quadrature component signal is shifted in phase by 90° at the HILBERT filter 22 and the in-phase component signal is delayed at the delay circuit 21, which undergo addition (or subtraction) at the adder 23 to have the image signals rejected, thus giving an effect of rejecting images by a simple configuration.

Furthermore, to reject the image, the HILBERT filter 22 includes an odd number of the delay circuits 30 which are connected in series and divided into a front-stage group and a rear-stage group symmetrically with respect to the central delay circuits 30, a plurality of adders 31 which performs subtraction between the input signals of the front-stage group delay circuits 30 and the output signals of the rear-stage group delay circuits 30, an adder 31 which performs subtraction between the input and output signals of the central delay circuit in such a configuration that the subtraction results are multiplied at the multiplier 32 by a HILBERT coefficient so that the multiplication results may be added up at the adder 33, whereby the inputs/outputs of the delay circuits 30 arranged symmetrically undergo subtraction and are multiplied by the filter coefficient and then added up to thereby reduce the number of the multipliers 32 to half that of the delay circuits 30, thus greatly reducing the hardware configuration load.

Furthermore, since the even-numbered filter's coefficient is 0 (zero) owing to the filter coefficient characteristics in the FILBERT filter 22, by performing no multiplication, an effect can be obtained of further halving the number of multiplication operations required, to greatly reduce the processing load.

According to the low-IF type conversion receiver of the present invention, it is possible to perform at the complex frequency converter 24 the frequency conversion processing to remove an offset provided at the local oscillator 5' to thereby output an in-phase component signal by multiplying an input signal by a value of the SIN table 40 at the multiplier 41 and a quadrature component signal by multiplying the input signal by a value of the COS TABLE 42 at the multiplier 43, thus giving an effect of rejecting an offset frequency by a simple configuration/processing.

Furthermore, in the complex frequency converter 24 includes, the SIN table 44 and the COS table 45 which set beforehand to perform frequency conversion processing to reject a minute frequency offset are used to multiply the in-phase component signal output by the multiplier 41 by a value of the SIN table 44 at the multiplier 46, the in-phase component signal output by the multiplier 41 by a value of the COS table 45 at the multiplier 47, the quadrature component signal output by the multiplier 43 by the value of the COS table 45 at the multiplier 48, and the quadrature component signal output by the multiplier 43 by the value of the SIN table 44 at the multiplier 49, so that a subtraction is performed on the output of the multiplier 48 and that of the multiplier 49 at the subtractor 50 and an addition is performed on the output of the multiplier 48 and that of the multiplier 49, thus giving an effect of removing the minute frequency offset accurately.

The low-IF type direct conversion receiver of the present invention can be used in a receiver to thereby improve the image rejection ratio and, furthermore, reduce the hardware configuration load, thus making such a configuration of the receiver that the processing load is reduced.

BY the present invention, a reception signal is multiplied at the first multiplier by a carrier wave having a frequency of a reception frequency oscillated by the local oscillator plus an offset to output an in-phase component digital signal through the first low pass filter and the first AD converter, while at the same time the reception signal is multiplied at the second multiplier by a carrier wave obtained by shifting the output of the local oscillator at the 90° phase shifter to output a quadrature component digital signal through the second low pass filter and the second AD converter, so that these in-phase component and quadrature component digital signals are input to the digital signal processing section to have their image frequency components rejected there and the offset provided at the local oscillator removed in frequency conversion processing, whereby the image frequency signal is rejected by the digital signal processing, thus giving an effect of improving the image rejection ratio as compared to the case where analog processing is employed.

By the present invention, in the digital signal processing section of the above-mentioned low-IF type direct conversion receiver, the quadrature component digital signal is shifted by 90° in phase by the HILBERT filter and output, at the same time, is delayed by the delay circuit by the same delay time as a delay time of the HILBERT filter and output, so that both outputs undergo addition or subtraction at the adder to reject the image frequency signal, an output of which enters the complex frequency converter, where the offset provided at the local oscillator is removed in frequency conversion processing to thereby output an in-phase component signal and a quadrature component signal, which then pass through the low pass filter.

By the present invention, in the HILBERT filter of the direct conversion receiver, an odd number of the delay circuits which output an input signal as delayed are connected in series and divided into a front-stage group and a rear-stage group symmetrically with respect to the central one of these delay circuits, so that subtraction is performed at the adders on the input signals of the front-stage group delay circuits and the output signals of the rear-stage group delay circuits disposed symmetrically with each other and also on the input and output signals of the central delay circuit, respective output signals of which adders are multiplied by the filter coefficient at the plurality of multipliers respectively, outputs of which are added up at the adder, whereby the signals are multiplied by the filter coefficient after undergoing subtraction and then are added up, to halve the number of the required multipliers, thus greatly reducing the configuration load of the hardware.

By the present invention, the plurality of multipliers in the HILBERT filter of the direct conversion receiver does not perform multiplication when the multiplier filter coefficient is 0 to thereby halve the number of the multiplication operations performed by the multipliers, thus greatly reducing the processing load.

Furthermore, in the above-mentioned direct conversion receiver of the present invention, the complex frequency converter sets beforehand in the first SIN table and the first COS table such values as to be used to perform frequency conversion processing to remove an offset provided at the local oscillator, so that the first multiplier multiplies an input signal by the value in the first SIN table to output an in-phase component signal and the second multiplier multiplies the input signal by the value in the first COS table to output a quadrature component signal, thus giving an effect of rejecting the offset frequency by a simple configuration and processing.

By the present invention, the complex frequency converter in the direct conversion receiver sets beforehand in the second SIN table and the second COS table such values as to be used to perform frequency conversion processing to reject a minute frequency offset, then the in-phase component signal output from the first multiplier is multiplied at the third multiplier by the value in the second SIN table and multiplied at the fourth multiplier by the value in the second COS table and the quadrature component signal output from the second multiplier is multiplied at the fifth multiplier by the value in the second COS table and multiplied at the sixth multiplier by the value in the second SIN table, and then an output of the third multiplier and that of the fifth multiplier undergo subtractions at the subtractor while an output of the fourth multiplier and that of the sixth multiplier undergo addition and subtraction at the adder, thus giving an effect of removing even the minute frequency offset accurately.

What is claimed is:

1. A direct conversion receiver which comprises:
   a local oscillator which oscillates a carrier wave at a reception frequency plus an offset;
   a first multiplier which multiplies a reception signal by an output of the local oscillator;
   a first low pass filter which rejects a double wave from an output of the first multiplier;
   a first AD converter which converts an output of the first low pass filter into a digital signal to provide an in-phase component of the digital signal;
   a first 90° phase shifter which shifts the output of the local oscillator by 90°;
   a second multiplier which multiplies the reception signal by an output of the first 90° phase shifter;
   a second low pass filter which reject the double wave from an output of the second multiplier;
   a second AD converter which converts an output of the second low pass filter into the digital signal to provide a quadrature component of the digital signal; and
   a digital signal processing section which performs processing for receiving the in-phase component of the digital signal and the quadrature component of the digital signal to reject an image frequency signal contained in these received signals and which performs frequency conversion processing for removing the offset provided at the local oscillator; wherein the digital signal processing section comprises:
   a second 90° phase shifter which receives the quadrature component of the digital signal output from the second AD converter and which performs 90° phase shift processing;
   a delay circuit which receives the in-phase component of the digital signal output from the first AD converter to output it with the same delay time as a delay time in the second 90° phase shifter; and
   an adder which performs addition or subtraction between an output of the second 90° phase shifter and an output of the delay circuit.

2. The direct conversion receiver according to claim 1, wherein the second 90° phase shifter is a HILBERT filter which performs 90° phase shift processing by HILBERT conversion.

3. The direct conversion receiver according to claim 2, wherein the HILBERT filter comprises:
   an odd number of the delay circuits for outputting an input signal while delaying the input signal, the delay circuits being connected in series and divided into a front-stage group and a rear-stage group symmetrically with respect to the central one of the odd number of the delay circuits;
   a plurality of adders which performs subtraction between the input signals of the delay circuits of the front-stage group and the output signals of the delay circuits of the rear-stage group disposed symmetrically with each other;
   an adder which performs subtraction between the input and output signals of the central delay circuit;
   a plurality of multipliers which multiplies the output signal of each of the adders by a filter coefficient; and
   an adder which adds up the outputs of the plurality of multipliers.

4. The direct conversion receiver according to claim 3, wherein the plurality of multipliers in the HILBERT filter does not perform the multiplication when the filter coefficient for the multiplication is 0.

5. A direct conversion receiver which comprises:
   a local oscillator which oscillates a carrier wave at a reception frequency plus an offset;
   a first multiplier which multiplies a reception signal by an output of the local oscillator;
   a first low pass filter which rejects a double wave from an output of the first multiplier;
   a first AD converter which converts an output of the first low pass filter into a digital signal to provide an in-phase component of the digital signal;
   a 90° phase shifter which shifts the output of the local oscillator by 90°;
   a second multiplier which multiplies the reception signal by an output of the 90° phase shifter;
   a second low pass filter which reject the double wave from an output of the second multiplier;
   a second AD converter which converts an output of the second low pass filter into the digital signal to provide a quadrature component of the digital signal; and
   a digital signal processing section which performs processing for receiving the in-phase component of the digital signal and the quadrature component of the digital signal to reject an image frequency signal contained in these received signals and which performs frequency conversion processing for removing the offset provided at the local oscillator, wherein the digital signal processing section comprises:
   a complex frequency converter which performs frequency conversion processing for removing an offset provided at the local oscillator for signal from which the image frequency signal is removed, thereby outputting the in-phase component and quadrature component signals; and
   a low pass filter which gives a band limit to each of the in-phase component and quadrature-component signals sent from the complex frequency converter, wherein the complex frequency converter comprises:
   a first SIN table and a first COS table which are set beforehand to perform frequency conversion processing for rejecting the offset provided at the local oscillator;
   a first multiplier which multiplies an input signal by a value in the first SIN table to output an in-phase component signal; and
   a second multiplier which multiplies the input signal by a value in the first COS table to output a quadrature component signal.

6. The direct conversion receiver according to claim 5, wherein the complex frequency converter comprises:
   a second SIN table and a second COS table which are set beforehand to perform frequency conversion processing for rejecting a minute frequency offset;
   a third multiplier which multiplies the in-phase component signal from the first multiplier by a value in the second SIN table;
   a fourth multiplier which multiplies the in-phase component signal from the first multiplier by a value of the second COS table;
   a fifth multiplier which multiplies the quadrature component signal from the second multiplier by the value in the second COS table;
   a sixth multiplier which multiplies the quadrature component signal from the second multiplier by the value of the second SIN table;
   a subtractor which subtracts the output of the third multiplier and the output of the fifth multiplier; and
   an adder which adds up the output of the fourth multiplier and the output of the sixth multiplier.

* * * * *